Patented July 24, 1951

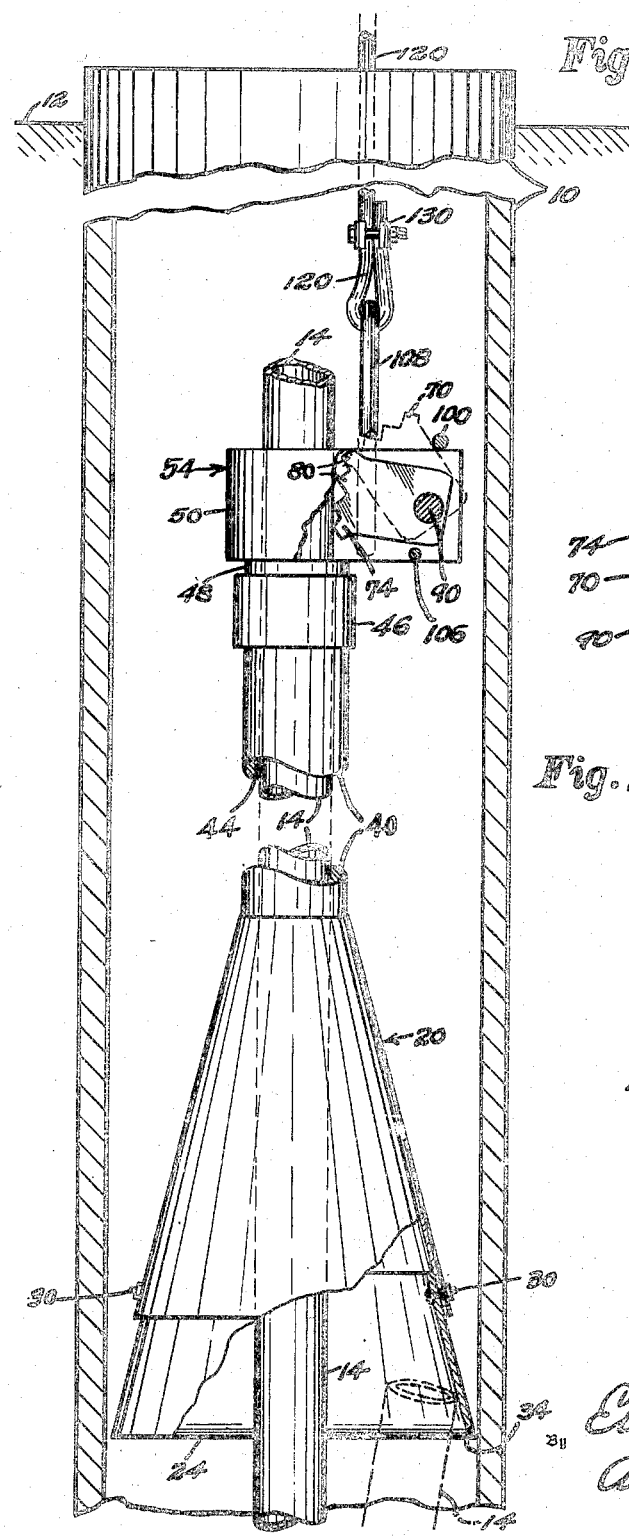
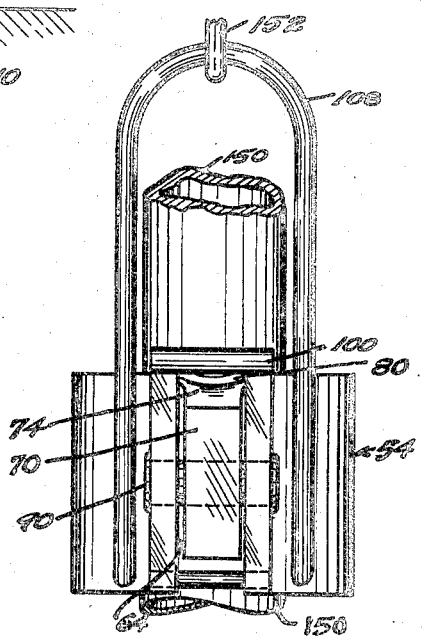
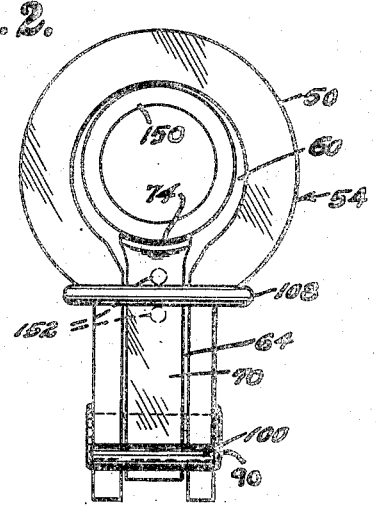

2,561,692

UNITED STATES PATENT OFFICE 2,561,692

PIPE PULLER

Ellery Fitch, Bogue, Kans.

Application April 4, 1949, Serial No. 85,421

1 Claim. (Cl. 294—86)

This invention relates to the making of wells and more particularly it is an object of the invention to provide an improved pipe puller or fishing tool for the recovery of broken portions of pipe disposed in the casing of an underground well.

A particular object of the invention is to provide a pipe recovering device as described having a guide portion which is expandable and retractable for snugly fitting well casings of various sizes.

Another object of the invention is to provide a pipe recovering device as described which is provided with improved pipe clamping means for securely gripping a pipe in an underground well casing prior to the pulling of the clamp and the pipe upwardly out of the well casing.

Yet a further object of the invention resides in the provision of a pipe clamping and pulling device of improved design and having many uses wherever there are pipes to be moved, whether to be lifted or to be pulled.

Another object of the invention is to provide a clamping device as described for many other uses, and which is provided with means for maintaining a clamping member thereof disposed with its clamping end toward a pipe receiving passageway thereof.

Another object of the invention is to provide a clamping device as described having teeth for effectively gripping a pipe to be pulled or moved.

Another object of the invention is to provide a device for the purpose described which is sturdy and durable in construction, reliable and efficient in operation, simple and inexpensive to manufacture, assemble and utilize.

Other and still further objects and advantages of the invention will become apparent from the following detailed description of a preferred embodiment thereof.

In the drawings:

Figure 1 is a side elevation of a well casing shown with a pipe therein, the pipe removing device of this invention being shown in a position over the end of the pipe, portions of the casing of the pipe and of the pipe recovering device being broken away and other portions showing in section; the position of the pipe prior to engagement with the pipe recovering device being indicated in dotted lines.

Figure 2 is also a side elevational view on an enlarged scale and taken at a right angle to that shown in Figure 1 showing the pipe pulling device of this invention shown as secured to a portion of a pipe, a portion of a cable attached to the pipe pulling device being shown secured thereto.

Figure 3 is a plan view of the parts shown in Figure 2, as seen from the upper end thereof.

The pipe removing device of this invention is particularly adapted for fishing in the casing 10 of a well, usually beneath the surface 12 of the ground for the upper end of a broken pipe 14 at times when the latter is disposed in the casing 10, as illustrated in dotted lines in Figure 1.

The pipe recovering device includes a pipe guiding member generally indicated at 20. The member 20 is funnel-shaped having upwardly and inwardly tapering inner walls in its downwardly disposed hollow lower end.

The purpose of the guide 20 is to catch the upper end of the pipe 14 at a time when the guide is being lowered into a well casing and for guiding the pipe toward the center of the casing and into a later described pipe clamping member. For this purpose it is desirable that the lower edge of the guide 20 conform to the shape of the interior of the casing 10.

To make possible the use of the guide 20 in well casings 10 of various diameters, a skirt 24 is provided for extending about the lower end of the guide 20. The skirt 24 is preferably of the shape of a frustrum of a cone when secured in position on the guide 20 by means of suitable bolts 30.

The skirt 24 may, if desired, be provided with overlapping ends, not shown, for adjustability so that the lower end of the skirt 24 is adapted to be of slightly lesser size than the interior of the casing 10. Optionally, special skirts 24 can be made for each different casing 10 without overlapping construction.

The lower edge of the guide, or of the skirt if a skirt is employed, is preferably tapered downwardly and outwardly from the interior thereof to the exterior thereof, as shown at 34, for improving the efficiency of the guide in getting around the outer side of the upper end of the pipe 14.

The guide 20 is provided with an opening in the upper end thereof which is disposed in communication with a sleeve portion 40 having a hollow interior 44. The interior 44 is preferably of a size but slightly larger than the pipe 14 for slideably receiving the latter. The upper end of the sleeve portion 40, is secured by means of a coupling 46 to a short connecting sleeve 48, which latter is secured preferably by welding to the yoke portion 50 of a U-shape clamp generally indicated at 54.

The clamping device 54 is provided with a passageway 60 therethrough for the reception of the pipe 14. The passageway 60 is elongated, and the yoke 50 is further provided with a slot 64 having parallel oppositely disposed arms spaced apart with respect to each other and disposed in parallelism with the axis of the elongated passageway 60.

The clamping member 54 further includes a locking member or dog 70 disposed between the arms in the slot 64 and having a toothed clamping end 74 disposed in the passageway 60 for engaging the pipe 14. The locking member 70 is preferably provided with teeth 80 on its clamping end 74 and is pivotally secured, by means of a pin 90, to the walls of the slot 64, in a position on the locking member 70 spaced apart from the clamping end 74 so as to permit the locking member 70 to pivot in a plane in parallelism with the elongated passageway 60.

The clamping device further includes a bar 100 disposed across and secured to the upper end of the yoke 50 and across the passageway 64 for limiting swinging movements of the locking member 70 in a clockwise direction, as seen in Figure 1.

A pin 106 is disposed through the opposite side walls of the slot 64 beneath the locking member 70 in a position for limiting pivotal movements of the locking member 70 in a counter-clockwise direction, as seen in Figure 1.

The invention further includes an attachment loop linkage 108 formed preferably of a U-shape, having its lower end suitably and rigidly secured to the yoke 54. The linkage 108 is elongated and is disposed extending in parallelism with the passageway 60.

In operation, the pipe recovering device, as described, is lowered into the interior of the well casing 10 until the inclined lower edges 34 strike the pipe 14, guiding the latter through the sleeve 40 and passageway 60.

At such time, the operator can pull upwardly on a cable 120 secured to the linkage 108 by a cable clamp 130, causing the locking member 70 to press against and securely hold the pipe 14. Further upward pulling on the cable 120 will cause the pipe 14 to be drawn upwardly and into a position such that another pipe length can be spliced thereto. If desired, the pipe 14 can be entirely removed.

The clamping device of the invention has other uses apart from attachment to the guide 20 and in such uses is adapted to function as a pipe puller wherever pipes are desired to be pulled or lifted.

Figure 2 illustrates the use of a clamping member 54 by itself as a pipe pulling device, the operation being similar in all respects to its previously described use. Like numerals will be used to designate the different parts of the clamping or pipe pulling device shown in Figures 2 and 3, although the pipes being moved would be different and the cable employed would be different. For this latter reason the pipe in Figures 2 and 3 is given the numeral 150 and the cable is given the numeral 152.

This invention has provided a device for recovering pipes from well casings of various sizes and has further provided a pipe puller for use wherever pipe is to be lifted or moved.

From the foregoing description it is thought to be obvious that a pipe puller constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as claimed.

I claim:

In a device for recovering pipe from well casings, the combination which comprises an inverted funnel-shaped guide having a sleeve extended upwardly therefrom and having a coupling on the upper end of the sleeve, a substantially U-shaped clamp having parallel arms extended outwardly from a substantially cylindrical section, a sleeve connecting the said substantially cylindrical section of the clamp to the coupling on the upper end of the sleeve extended from the funnel-shaped guide, a dog having teeth on the inner end positioned between the arms of the clamp, a pin extended through the said arms of the clamp and dog pivotally mounting the dog in the clamp and positioned whereby the teeth of the dog engage the surface of a pipe extended through the clamp and guide, pins extended across the upper and lower edges of the arms of the clamp for limiting movement of the dog whereby the dog permits downward movement of the device on the pipe and grips the pipe in upward movement thereof drawing the pipe upwardly as the device is drawn upwardly, an upwardly extended cable attaching U-shaped loop carried by and positioned over the outer surface of the clamp, and a split skirt removably mounted in the lower end of the said funnel-shaped guide for adjusting the outside diameter thereof.

ELLERY FITCH.

REFERENCES CITED

The following references are of record in the file of this patent:

UNITED STATES PATENTS

| Number | Name | Date |
|---|---|---|
| 896,520 | Deuchar | Aug. 18, 1908 |
| 1,014,504 | Miller | Jan. 9, 1912 |
| 1,290,642 | Nelson | Jan. 7, 1919 |
| 1,305,438 | Braun | June 3, 1919 |